United States Patent [19]

Bahr et al.

[11] Patent Number: 4,494,233
[45] Date of Patent: Jan. 15, 1985

[54] METHOD AND APPARATUS FOR THE DETECTION AND REGENERATION OF A LOST TOKEN IN A TOKEN BASED DATA COMMUNICATIONS NETWORK

[75] Inventors: Richard G. Bahr, Framingham; Paul B. Cohen, Ashland, both of Mass.

[73] Assignee: Prime Computer, Inc., Natick, Mass.

[21] Appl. No.: 466,109

[22] Filed: Feb. 14, 1983

[51] Int. Cl.³ .............................................. H04Q 9/00
[52] U.S. Cl. ...................................... 370/86; 370/89; 340/825.05
[58] Field of Search .......................... 370/86, 89, 90; 340/825.05

[56] References Cited

U.S. PATENT DOCUMENTS

| 3,593,290 | 7/1971 | Kerr | 370/90 |
| 4,063,220 | 12/1977 | Metcalfe et al. | 340/147 LP |
| 4,281,380 | 7/1981 | DeMesa et al. | 364/200 |
| 4,292,623 | 9/1981 | Eswaran et al. | 340/147 R |

Primary Examiner—Douglas W. Olms
Assistant Examiner—Timothy K. Greer
Attorney, Agent, or Firm—Lahive & Cockfield

[57] ABSTRACT

A token-passing, ring-based data communications network provides a distributive method and apparatus for detecting and regenerating a lost token. The method includes, after detection of the loss of the token, transmitting at a detecting node a data packet not including a token, the data packet uniquely identifying the transmitting node as the data source. Simultaneously, the transmitting node, after transmitting the tokenless data packet, strips all incoming data from the network. If the transmitted packet is successfully received by the transmitting node, a new token is generated by the node. If the packet is not received, the node defers to an arbitration method which includes delaying a next data packet transmission for a probabilistically determined period of time. The mean time upon which the probabilistic approach is based increases with each unsuccessful data packet transmission attempt.

10 Claims, 3 Drawing Figures

METHOD AND APPARATUS FOR THE DETECTION AND REGENERATION OF A LOST TOKEN IN A TOKEN BASED DATA COMMUNICATIONS NETWORK

BACKGROUND OF THE INVENTION

The invention relates generally to data communications networks and in particular to a method and apparatus for the detection and regeneration of a lost token in a token passing data communications network.

The advent of intelligent terminals incorporating a microprocessor has lead to the development of new generations of data communications networks. The networks differ from each other in many features, such as for example the topology of the network, the type of apparatus which is attached to the network, and the protocols used on the network to avoid collision of messages or other interferences. In one particular type network, known as a ring network, various nodes are interconnected along a continuous loop so that a message is passed from node to node in a single direction. The message identifies its source and destination in what is generally called the header portion of the message.

In the ring topology, as in many other data communications systems, absent predetermined protocols or priorities, more than one node could access the network simultaneously. A "collision" could then occur wherein two or more messages on the communications media would interfere and hence "garble" each other. As a result, there has been developed what is often called a token-passing protocol wherein a node cannot transmit a message on the network unless it has control or possession of the "token" or marker. According to one protocol, the node receives the token and transmits a data packet appending the token at the end of the data packet. The destination of the packet thus receives the message and passes the token onto a next node (assuming that the destination node does not itself have a data packet to transmit or that the token was not "grabbed" by an intermediate node).

It often happens due to for example noise or other electrical effects that the token can be "lost". This can happen, for example, as the token degenerates and is no longer recognizable due to losses or phase distortions as it passes along the channel. As a result, the network must have a protocol for regenerating the token. There have generally been two methods used for regenerating the token. According to the first method, one and only one of the nodes of the network is assigned the task of regenerating the token. This can often be costly in terms of network performance depending upon the location of the node relative to the location of the "disappearance" of the token and because it provides a single failure point. In other protocols, neighboring nodes generally arbitrate with respect to which node will regenerate the token. This requires complex circuitry and is often quite time consuming and hence reduces network performance.

It is therefore an object of the invention to provide a token regeneration protocol which is inexpensive to implement in terms of both time and hardware. Other objects of the invention are an apparatus and method for regenerating a token in a ring-based data communications network which is reliable, and capable of being implemented in MOS-VSLI integrated circuit designs.

SUMMARY OF THE INVENTION

The invention relates to a method and apparatus for detecting and regenerating a lost token on a token-passing, ring-based data communications network. The method features the steps of monitoring the communications network at each node having a pending data packet transmission for detecting the loss of the token; and transmitting, at each monitoring node detecting the loss of the token, a data packet not containing the token and which uniquely identifies the transmitting node as the source thereof. The method then features stripping, at each such transmitting node, all incoming data from the network; transmitting a new token upon the successful receipt by the transmitting node of the data packet transmitted from the node; and falling back to an arbitration method if the transmitted data packet is not received within a predetermined period of time. The method further features an arbitration method which delays transmission of a next data packet for a probabilistically determined period of time, the average time of the delay increasing, according to the probabilistic approach, according to the number of unsuccessful transmission attempts.

According to the invention, the monitoring step determines the loss of the token based upon at least one of the following criteria: a token transit time around the ring-based network wherein the token is not used by any node; a maximum allowable data packet duration; and the multiplicative product of the maximum number of nodes and the maximum packet duration.

The apparatus according to the preferred embodiment of the invention features circuitry for monitoring the communications network at each node having a pending data packet transmission and which detects the loss of a token. The circuitry then transmits, at each such node which detects the loss of the token, a data packet which uniquely identifies the transmitting node as the source of the packet but which does not include a token, which under normal circumstances would have been included in the packet. While the packet is circulating around the ring, each transmitting node strips all incoming data from the ring network and upon the successful receipt of the transmitted data packet, the transmitting node generates a new token and places it on the ring.

The apparatus further features circuitry for implementing the arbitration method noted in connection with the description of the method of the invention if the transmitted data packet is not received within a predetermined time out period.

BRIEF DESCRIPTION OF THE DRAWINGS

Other objects, advantages, and features of the invention will be apparent from the following description taken together with the drawings in which.

DESCRIPTION OF A PREFERRED EMBODIMENT

Figure 1:
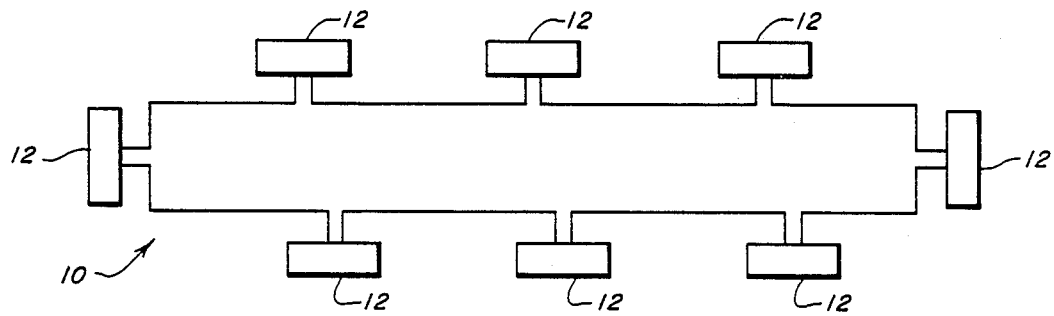
FIG. 1 is a schematic block diagram of a typical ring network according to the invention.

Referring to FIG. 1, a ring-based data communications network 10 has a plurality of nodes 12 attached thereto. The ring network 10 is of the type designated a token-passing network so that a node 12 cannot transmit data on the network unless it has in its possession or control the token or marker. The token or marker is passed along the ring network in a unilateral direction by the nodes 12. As the marker is passed from node to node, it can deteriorate or otherwise become unreadable. In addition, external forces such as electrical noise can further aid in the deterioration and loss of the token. Finally a malfunction, for example at a node, can effect loss of the token.

When the token is lost, it must be regenerated by one or more of the nodes, operating either singly or together. In accordance with the illustrated embodiment, the token regeneration method is implemented by a distributive function wherein each of nodes 12, operating independently, can effect regeneration of the token.

Figure 2:
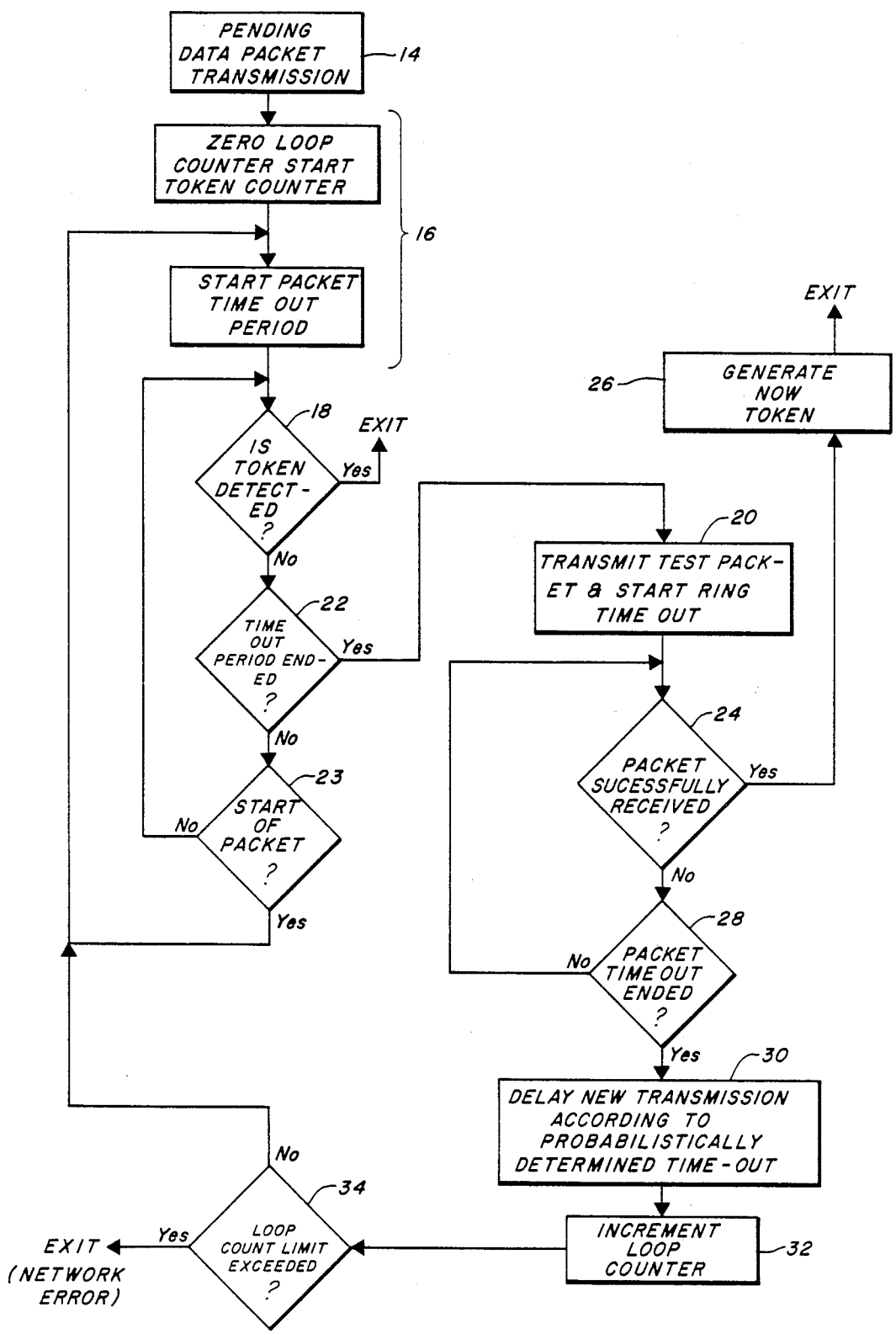
FIG. 2 is a flow chart showing the method of the invention for detecting and generating a new token when necessary.

According to the invention, and referring to FIG. 2, each time a data packet is ready to be transmitted, for example at 14, a time out period is started. This is indicated at 16. The time out period is based upon at least one of the following criteria: the token transmit time around the ring upon the assumption that the token is not used by any of the nodes, a maximum allowable data packet duration, and/or the multiplicative product of the maximum number of nodes on the network and the maximum data packet duration. Thus, the time out period is related to the real time required for a token to make one complete circuit around the ring.

In the illustrated embodiment, two time out timers are employed, a token timer and a data packet timer. If either timer "times out", it is presumed that the time out period has ended and that the token must be regenerated. The token timer, in the illustrated embodiment, is set to a time equal to the multiplicative product of the maximum number of nodes on the network and the maximum data packet duration. The packet timer, in the illustrated embodiment, is set to a time greater than the maximum packet size plus the maximum network delay. In the illustrated embodiment a time duration equal to twice the sum of the maximum packet size and maximum network delay is conveniently used. Both timers are initiated at a node when a data packet is ready for transmission.

Each node 12 which is ready to transmit thus continually "looks" for the token (at 18) and once found, the detection of a token starts the pocket transmission. If the token is not detected within the time allotted, the node goes into a token regeneration mode of operation. This occurs at 20 after the time out period has ended at 22. If the time out period has not ended and a packet is seen, the packet time out period is restarted (at 23).

At this time, a data packet is applied to the ring network by a node 12. The data packet is unique to the node and contains correct parity and an identification of the source of the packet. At the same time that the packet is placed on the ring, a packet time out clock is started. For this stage of operation, the time out duration is preferably set to one-half of the time out duration ordinarily associated with the packet timer. This time is not critical but is designed to limit the allowable transit time for the packet. If the packet is successfully received (at 24) prior to the end of the packet time out period, the node 12 generates a new token, 26, and normal operation of the ring resumes. The successfully received packet is that packet which identifies the receiving node as the source of the packet and optionally, which maintains its proper parity. In the illustrated embodiment, the parity check is not required. The packet could have but need not have included other pertinent information.

If the packet is not received before the packet time out period ends, at 28, the node is effectively taken "off line" for a time period which is determined probabilistically in accordance with the maximum time it takes a packet to circulate in the ring. The probabilistically determined time out period (at 30) sets a time during which no transmission of a data packet will be made by the node. Furthermore, unlike the time duration during which the data packet was circulating and during which any new data was stripped from the network, during the time out period new data is examined for a token. If the token is received during the delay, that is, the token was regenerated by another node, normal ring operation resumes. Otherwise, after the probabilistically determined time out period ends, the node transmits a next test data packet (which may be the same data packet) at 20 and the entire procedure continues. Importantly, the mean time of the probabilistically determined time out period increases in direct proportion to the number of unsuccessful transmission attempts. In the illustrated embodiment, a limit is placed on the number of retries after which the network is declared inoperative (at 32 and 34).

Figure 3:
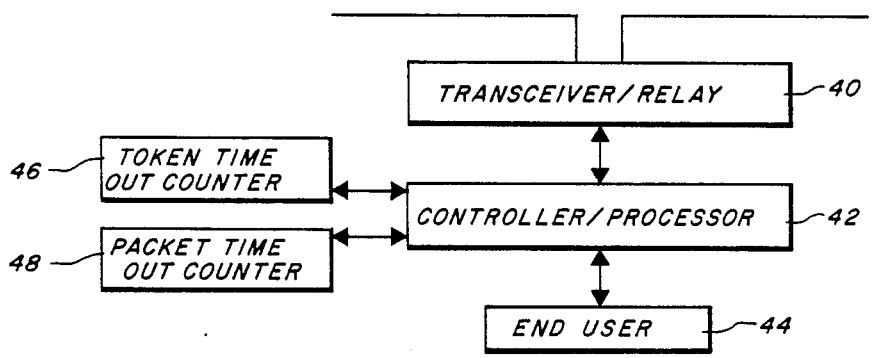
FIG. 3 is a block diagram of a typical node for detecting and generating a lost token.

In accordance with the invention, referring to FIG. 3, each node 12 has a transceiver/relay 40, a controller/processor 42, and end user equipment 44. The controller/processor is typically a microprocessor based system which controls operation of a relay in the transceiver for bypassing the node and operation of the transceiver itself. The microprocessor prepares the data which the transceiver will apply to the network, and operates to monitor the data received by the transceiver and to control the processing of that data. That data which is to be used by the node, is applied to the end user 44.

The microprocessor of controller/processor 42 is designed to implement the flow chart of FIG. 2 using a token detect time out counter 46 and a packet time out counter 48.

It would be obvious to those skilled in the art to modify the specific microprocessor implementation as well as the flow chart of FIG. 2 to accomplish the goals of the present invention. Therefore, additions, subtractions, deletions, and other modifications of the disclosed preferred embodiment would be obvious to those practiced in the art and are within the scope of the following claims.

What is claimed is:

1. In a token-passing, ring-based data communications network, a method for the detection and regeneration of a lost token comprising the steps of monitoring the communication network at each node having a pending packet transmission for detecting the loss of the token, transmitting, at each monitoring node detecting the loss of the token, a data packet without a token, said data packet uniquely identifying the transmitting node as the source, stripping, at each such transmitting node, all incoming data from the network, transmitting a new token upon successful receipt of its transmitting data packet by the node which transmitted it, and instituting a node transmission arbitration method if the transmitted data packet is not received within a predetermined time out period.

2. The method of claim 1 wherein said instituting step comprises the step of
delaying transmission of a next data packet for a probabilistically determined period of time, the mean time of said probabilistic approach increasing with each unsuccessful transmission attempt.

3. The method of claim 1 wherein
said monitoring step determines the loss of the token based upon at least one of
a token transit time around the ring based network wherein the token is not used,
a maximum allowable data packet duration, and
a multiplicative product of the maximum number of nodes and the maximum packet duration.

4. In a token-passing, ring-based data communications system, a method for the detection and regeneration of a lost token comprising the steps of
monitoring the communications network at each node connected to the network and having a data packet for transmission for detecting the loss of the token, said monitoring step basing said loss of token upon at least one of
a token transit time around the ring-based network during which time the token is not used by any node,
a maximum allowable data packet duration, and
the multiplicative product of the maximum number of nodes allowable on the network and the maximum packet duration,
transmitting, at each node detecting the loss of the token, a data packet not including a token, which packet uniquely identifies the transmitting node as the source of the data packet,
stripping, at each such transmitting node, all incoming data from the communications network,
transmitting a new token upon successful receipt of the transmitted data packet, said successful receipt being the recognition of the node as the node which is the transmitting source of the data packet, and
initiating a node transmission arbitration method when the transmitted data packet is not successfully received within a predetermined time out period, said arbitration method including delaying transmission of a next data packet for a probabilistically determined period increasing with each unsuccessful attempt to transmit and receive a data packet on said ring-based data communications network.

5. A token-passing ring-based data communications network having means for detecting and regenerating a lost token comprising means for monitoring the communications network at each node having a pending packet transmission, for detecting the loss of the token,
means for transmitting, at each node detecting the loss of a token, a data packet not including a token which packet uniquely identifies the transmitting node as the source,
means for stripping all incoming data from the communications network in response to the transmission of a said data packet without a token,
said transmitting means further having means for transmitting a new token upon successful receipt of its transmitted data packet, and
means for instituting a node transmission aribration method if the transmitted data packet is not received within a predetermined time out period.

6. The apparatus of claim 5 wherein said instituting means comprises
means for probabilistically determining a delay period, the mean time of the delay period increasing with each unsuccessful transmission attempt, and
means for delaying transmission of a next packet of data without a token for said probabilistically determined delay period.

7. The apparatus of claim 5 further wherein said monitoring means includes means for determining the loss of the token while taking into account at least one of
a token transit time around the ring-based network wherein the token is not used,
a maximum allowable data packet duration, and
a multiplicative product of the maximum number of nodes allowed on the network and the maximum packet duration.

8. The apparatus of claim 5 wherein said transmitting means further comprises means for determining the successful receipt of a transmitted data packet by recognizing the source of the packet as being said transmitting node.

9. The method of claim 1 wherein
said monitoring step employs a packet timing period and a token timing period for determining the loss of the token.

10. The apparatus of claim 5 further wherein said monitoring means comprises
a packet timer, and
a token timer,
said packet timer and said token timer being initiated when the node has a pending data packet transmission,
said token timer having a duration equal to the multiplicative product of the maximum number of nodes on the network and the maximum packet duration, and
said packet timer having a time duration greater than the sum of the time duration of a maximum size data packet and the maximum transit time around the network.

* * * * *